US006237089B1

(12) United States Patent
Moyer et al.

(10) Patent No.: US 6,237,089 B1
(45) Date of Patent: May 22, 2001

(54) METHOD AND APPARATUS FOR AFFECTING SUBSEQUENT INSTRUCTION PROCESSING IN A DATA PROCESSOR

(75) Inventors: William C. Moyer, Dripping Springs; Jeffrey W. Scott, Austin, both of TX (US)

(73) Assignee: Motorola Inc., Schaumburg, IL (US)

(*) Notice: Subject to any disclaimer, the term of this patent is extended or adjusted under 35 U.S.C. 154(b) by 0 days.

(21) Appl. No.: 09/425,469

(22) Filed: Oct. 22, 1999

Related U.S. Application Data (62) Division of application No. 08/963,321, filed on Nov. 3, 1997, now Pat. No. 6,000,029.

(51) Int. Cl.$^7$ .................................................. G06F 9/00
(52) U.S. Cl. ............................................................. 712/244
(58) Field of Search .................................................. 712/244

(56) References Cited

U.S. PATENT DOCUMENTS

| | | | |
|---|---|---|---|
| 4,236,204 | 11/1980 | Groves | 364/200 |
| 4,259,717 | 3/1981 | Nakamura | 364/200 |
| 4,435,766 | 3/1984 | Haber et al. | 364/300 |
| 4,764,893 | 8/1988 | Karabatsos | 364/900 |
| 5,283,870 | 2/1994 | Joyce et al. | 395/200 |
| 5,301,312 | 4/1994 | Christopher, Jr. et al. | 395/575 |
| 5,363,506 | * 11/1994 | Fukuoka | 710/267 |
| 5,471,595 | 11/1995 | Yagi et al. | 395/375 |
| 5,579,505 | 11/1996 | Ohkami | 395/482 |
| 5,581,745 | 12/1996 | Muraoka et al. | 395/557 |
| 5,590,380 | 12/1996 | Yamada et al. | 395/868 |
| 5,594,880 | 1/1997 | Moyer | 395/595 |
| 5,615,374 | * 3/1997 | Sadoi et al. | 710/200 |

FOREIGN PATENT DOCUMENTS

| | | | |
|---|---|---|---|
| WO 91/20039 | 12/1991 | (EP) | G06F/13/00 |
| WO 97/30391 | 8/1997 | (EP) | G06F/9/46 |

OTHER PUBLICATIONS

David Mosberger, et al. "Implementing Atomic Sequences on Uniprocessors Using Rollforward," Software–Practice and Experience, vol. 26(1), Jan. 23, 1996, pp. 1–23.

Brian N. Bershad "Practical Considerations for Non–Blocking Concurrent Objects," © 1993 IEEE Computer Society Press, pp. 264–273.

* cited by examiner

Primary Examiner—William M. Treat
(74) Attorney, Agent, or Firm—Susan C. Hill (57) ABSTRACT

A method and apparatus affects subsequent instruction processing in a data processor (10). In one embodiment, a delay interrupt recognition instruction (IDLY4) is executed by data processor (10) to delay or conditionally delay interrupt recognition for a controlled interval, either for a predetermined period of time or for a predetermined number of instructions, so that a read/modify/write sequence of instructions can be performed without dedicated instructions which define the modification operation. The IDLY4 instruction may affect the manner in which subsequent instructions affect a condition bit (38). The condition bit (38) may thus be used to determine if exception processing occurred during the interrupt non-recognition interval after execution of the IDLY4 instruction.

16 Claims, 6 Drawing Sheets

| IDLY4 | DELAY INTERRUPT RECOGNITION INSTRUCTION |
|---|---|
| OPERATION: | CAUSE INTERRUPT RECOGNITION TO BE DELAYED FOR THE FOLLOWING 4 INSTRUCTIONS. |
| ASSEMBLER SYNTAX: | IDLY4 |
| DESCRIPTION: | THE IDLY4 INSTRUCTION CAUSES INTERRUPT RECOGNITION TO BE POSTPONED FOR FOUR ADDITIONAL INSTRUCTION BOUNDARIES, THUS ALLOWING AN UNINTERRUPTIBLE INSTRUCTION SEQUENCE TO BE EXECUTED FOR CRITICAL VARIABLE UPDATES IN A MULTI-TASKING ENVIRONMENT. |
| CONDITION CODE: | THE CONDITION BIT 38 IS INITIALLY SET TO 1 BY EXECUTION OF THE IDLY4 INSTRUCTION. IF AN EXCEPTION OCCURS DURING THE EXECUTION OF THE FOLLOWING FOUR INSTRUCTIONS (OTHER THAN A TRACE OR BREAKPOINT EXCEPTION), THE CONDITION BIT 38 WILL BE CLEARED, ALLOWING FOR DETECTION OF AN INTERRUPTED SEQUENCE. |
| RESTRICTIONS: | THE INSTRUCTION FOLLOWING AN IDLY4 INSTRUCTION SHOULD ONLY CONSIST OF SINGLE CYCLE ARITHMETIC OR LOGICAL INSTRUCTIONS, BRANCH INSTRUCTIONS, AND LOAD OR STORE INSTRUCTIONS. ALL OTHER INSTRUCTIONS ARE NOT GUARANTEED TO BE UNINTERRUPTIBLE IN ORDER TO MINIMIZE THE EFFECT ON MAXIMUM INTERRUPT LATENCY. ANOTHER IDLY4 INSTRUCTION IN THE SEQUENCE WILL BE TREATED AS A NO OPERATION (NOP) INSTRUCTION. |

INSTRUCTION FORMAT:

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 1 | 1 | 1 |

OPTIONAL SPECIFIER 70

| | |
|---|---|
| IDLY4 | DELAY INTERRUPT RECOGNITION INSTRUCTION |

| |
|---|
| OPERATION: CAUSE INTERRUPT RECOGNITION TO BE DELAYED FOR THE FOLLOWING 4 INSTRUCTIONS. |
| ASSEMBLER SYNTAX: IDLY4 |
| DESCRIPTION: THE IDLY4 INSTRUCTION CAUSES INTERRUPT RECOGNITION TO BE POSTPONED FOR FOUR ADDITIONAL INSTRUCTION BOUNDARIES, THUS ALLOWING AN UNINTERRUPTIBLE INSTRUCTION SEQUENCE TO BE EXECUTED FOR CRITICAL VARIABLE UPDATES IN A MULTI-TASKING ENVIRONMENT. |
| CONDITION CODE: THE CONDITION BIT 38 IS INITIALLY SET TO 1 BY EXECUTION OF THE IDLY4 INSTRUCTION. IF AN EXCEPTION OCCURS DURING THE EXECUTION OF THE FOLLOWING FOUR INSTRUCTIONS (OTHER THAN A TRACE OR BREAKPOINT EXCEPTION), THE CONDITION BIT 38 WILL BE CLEARED, ALLOWING FOR DETECTION OF AN INTERRUPTED SEQUENCE. |
| RESTRICTIONS: THE INSTRUCTION FOLLOWING AN IDLY4 INSTRUCTION SHOULD ONLY CONSIST OF SINGLE CYCLE ARITHMETIC OR LOGICAL INSTRUCTIONS, BRANCH INSTRUCTIONS, AND LOAD OR STORE INSTRUCTIONS. ALL OTHER INSTRUCTIONS ARE NOT GUARANTEED TO BE UNINTERRUPTIBLE IN ORDER TO MINIMIZE THE EFFECT ON MAXIMUM INTERRUPT LATENCY. ANOTHER IDLY4 INSTRUCTION IN THE SEQUENCE WILL BE TREATED AS A NO OPERATION (NOP) INSTRUCTION. |

INSTRUCTION FORMAT:

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 1 | 1 | 1 |

OPTIONAL SPECIFIER 70

*FIG.3*

| INSTRUCTIONS | OPERATION | COMMENTS |
|---|---|---|
| | TEST MEMORY OPERAND FOR NON-ZERO, SET MEMORY OPERAND TO ALL ONES (TAS) | |
| BMASKI R1, 32 | BIT MASK IMMEDIATE | CONSTANT OF -1, STORED IN REGISTER R1 |
| LRW R2, SEMAPHORE | LOAD PROGRAM COUNTER RELATIVE WORD | POINTER TO VARIABLE (SEMAPHORE) STORED IN REGISTER R2 |
| IDLY4 | DELAY INTERRUPT RECOGNITION | BEGIN UNINTERRUPTIBLE SEQUENCE |
| LD R3, (R2,0) | LOAD | LOAD SEMAPHORE (INTERRUPTS MASKED) |
| BF SEQUENCE_FAILED | BRANCH IF FALSE (CONDITION BIT 38=0) | CHECK FOR EXCEPTION (OPTIONAL) (INTERRUPTS MASKED) |
| ST R1, (R2,0) | STORE | SET SEMAPHORE (INTERRUPTS MASKED) |
| BF SEQUENCE_FAILED | BRANCH IF FALSE (CONDITION BIT 38=0) | CHECK FOR EXCEPTION; IF EXCEPTION OCCURRED, CONDITION BIT 38=0 CAUSING A BRANCH TO SEQUENCE_FAILED (OPTIONAL) (INTERRUPTS MASKED) |
| CMPNEI R3, 0 | COMPARE NOT EQUAL IMMEDIATE (IF R3≠0, SET CONDITION BIT 38=1) | IF NO EXCEPTION, TEST SEMAPHORE (INTERRUPTS ARE NOW UNMASKED) |

FIG.4

| EXCHANGE MEMORY OPERAND WITH REGISTER OPERAND (XMEM) ||||
|---|---|---|
| INSTRUCTIONS || OPERATION | COMMENTS |
| LRW | R1, EXCHANGE_VALUE | LOAD PROGRAM COUNTER RELATIVE WORD | CONSTANT (EXCHANGE_VALUE) STORED IN REGISTER R1 |
| LRW | R2, SEMAPHORE | LOAD PROGRAM COUNTER RELATIVE WORD | POINTER TO VARIABLE (SEMAPHORE) STORED IN REGISTER R2 |
| IDLY4 | | DELAY INTERRUPT RECOGNITION | BEGIN UNINTERRUPTIBLE SEQUENCE |
| LD | R3, (R2,0) | LOAD | LOAD SEMAPHORE VALUE INTO REGISTER R3 (INTERRUPTS MASKED) |
| BF | SEQUENCE_FAILED | BRANCH IF FALSE (CONDITION BIT 38=0) | CHECK FOR EXCEPTION; IF EXCEPTION OCCURRED, CONDITION BIT 38=0 CAUSING A BRANCH TO SEQUENCE_FAILED (OPTIONAL) (INTERRUPTS MASKED) |
| ST | R1, (R2,0) | STORE | IF NO EXCEPTION, EXCHANGE SEMAPHORE VALUE AND CONSTANT (EXCHANGE_VALUE) (INTERRUPTS MASKED) |
| OR | R1, R1 | LOGICAL OR OPERATION | NO OPERATION (OPTIONAL) (INTERRUPTS MASKED) |

*FIG.5*

INCREMENT MEMORY-BASED COUNTER (INCMEM)

| INSTRUCTIONS | | OPERATION | COMMENTS |
|---|---|---|---|
| LRW | R2, SEMAPHORE | LOAD PROGRAM COUNTER RELATIVE WORD | POINTER TO VARIABLE (SEMAPHORE) STORED IN REGISTER R2 |
| IDLY4 | | DELAY INTERRUPT RECOGNITION | BEGIN UNINTERRUPTIBLE SEQUENCE |
| LD | R3, (R2,0) | LOAD | LOAD SEMAPHORE VALUE INTO REGISTER R3 (INTERRUPTS MASKED) |
| ADDI | R3, 1 | ADD IMMEDIATE | INCREMENT COUNTER (I.E. SEMAPHORE VALUE) (INTERRUPTS MASKED) |
| BF | SEQUENCE_FAILED | BRANCH IF FALSE (CONDITION BIT 38=0) | CHECK FOR EXCEPTION; IF EXCEPTION OCCURRED, CONDITION BIT 38=0 CAUSING A BRANCH TO SEQUENCE_FAILED (OPTIONAL) (INTERRUPTS MASKED) |
| ST | R3, (R2,0) | STORE | IF NO EXCEPTION OCCURRED, STORE INCREMENTED SEMAPHORE VALUE BACK INTO POINTER ADDRESS |

FIG. 6

METHOD AND APPARATUS FOR AFFECTING SUBSEQUENT INSTRUCTION PROCESSING IN A DATA PROCESSOR

This is based on prior U.S. patent application Ser. No. 08/963,321, filed on Nov. 3, 1997, now U.S. Pat. No. 6,000,029, which is hereby incorporated by reference, and priority thereto for common subject matter is hereby claimed.

FIELD OF THE INVENTION

The present invention relates to data processors, and more particularly to affecting subsequent instruction processing in a data processor.

BACKGROUND OF THE INVENTION

As data processors are used more and more in real-time control systems, new techniques are required to ensure the efficient use of system resources. For example, in many multi-tasking systems, there are several tasks trying to share some of the same system resources, such as memory storage, a printer, or a port to a display screen. It is crucial in such multi-tasking systems that the shared system resources are used in the most efficient way possible. For example, if multiple tasks are sharing a resource, there must be a way to indicate which task is currently using the resource and whether that task is performing a function that must not be disturbed. Semaphores are used for this function in many multitasking systems.

Semaphores are a type of flag or status indicator that reflects the present status of a system resource. Usually the status information in a semaphore indicates whether or not the system resource is presently being used. In some multi-tasking systems, the semaphore may also include information about which task is using the resource, and possibly even the type of function being performed on the resource.

For example, a particular location in memory can be designated as the location of the semaphore for a shared variable X. If any task wants to use the shared variable X, that task must read the semaphore for the shared variable X by reading that particular location in memory. The variable X semaphore contains information on the status of the variable X, such as whether the variable X is currently reserved for exclusive access by a particular task. If the variable X semaphore indicates that the variable X is currently reserved and is thus busy, the new task must wait. The new task can continue to poll the variable X semaphore by periodically reading the variable X semaphore to see if the variable X is still being used or if it has become available.

Once the variable X semaphore indicates that the variable X is no longer reserved and thus available, the waiting task writes to the variable X semaphore to change its status to busy or nonavailable. The waiting task has thus effectively locked the variable X resource for its own use. No other tasks can use the variable X while the variable X's semaphore indicates that the variable X is being used. Once the waiting task has finished using the variable X, it writes a new value to the variable X semaphore location in order to change the variable X semaphore to indicate that the variable X is once again available.

There is a significant problem that arises in systems that use semaphores to allocate shared system resources. The problem arises when more than one task is polling the semaphore of a shared resource to see if the resource has become available yet. For example, assume task #1 and task #2 are both polling the variable X semaphore. Task #1 is the first to read the variable X semaphore after it has been changed to indicate that the variable X is available. Task #2 now reads the variable X semaphore and also learns that the variable X is available. Neither task #1 nor task #2 is aware that another task is competing for the use of the variable X.

If task #1 receives an interrupt, task #1 must execute a software interrupt routine before resuming where it left off. Meanwhile, task #2 writes a value to the variable X semaphore to indicate that the variable X is now busy. Task #2 then proceeds to use the variable X. Task #1 finishes its interrupt routine and resumes where it left off in its software program. Task #1 left off knowing that the variable X was available. Task #1 thus writes a value to the variable X semaphore to indicate that the variable X is now busy and then proceeds to try to use the variable X. But the variable X is already being used by Task #2. Thus a collision results. As a consequence, the variable X may be corrupted and tasks may receive the incorrect value of variable X. Thus, an approach is needed which allows multiple tasks to effectively and efficiently share common resources.

DETAILED DESCRIPTION

Description of the Figures

Figure 1:
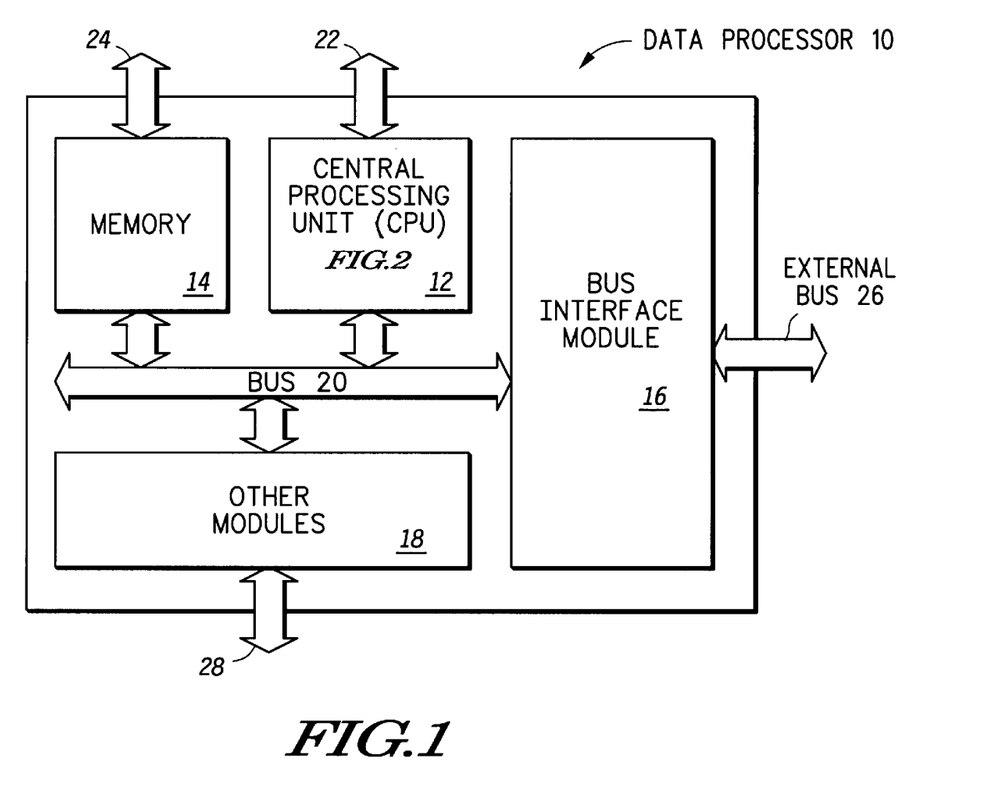
FIG. 1 illustrates, in block diagram form, a data processor 10 in accordance with one embodiment of the present invention.

FIG. 1 illustrates a data processor 10. In one embodiment, data processor 10 includes a central processing unit (CPU) 12, memory 14, bus interface module 16, and other modules 18, which are all bi-directionally coupled to each other by way of bus 20. Bus interface module 16 may be coupled external to data processor 10 by way of external bus 26. Other modules 18 are optionally coupled external to data processor 10 by way of one or more integrated circuit terminals 28. Memory 14 is optionally coupled externally to data processor 10 by way of one or more integrated circuit terminals 24. Central processing unit 12 is optionally coupled external to data processor 10 by way of one or more integrated circuit terminals 22.

Still referring to FIG. 1, alternate embodiments of the present invention may use any type of structure for data processor 10. In addition, data processor 10 may perform a wide variety of functions. For example, data processor 10 may use a RISC (Reduced Instruction Set Computer) architecture, may use a Harvard architecture, may be a vector processor, may be a SIMD (Single Instruction Multiple Data) processor, may perform floating point arithmetic, may perform digital signal processing computations, etc.

Figure 2:
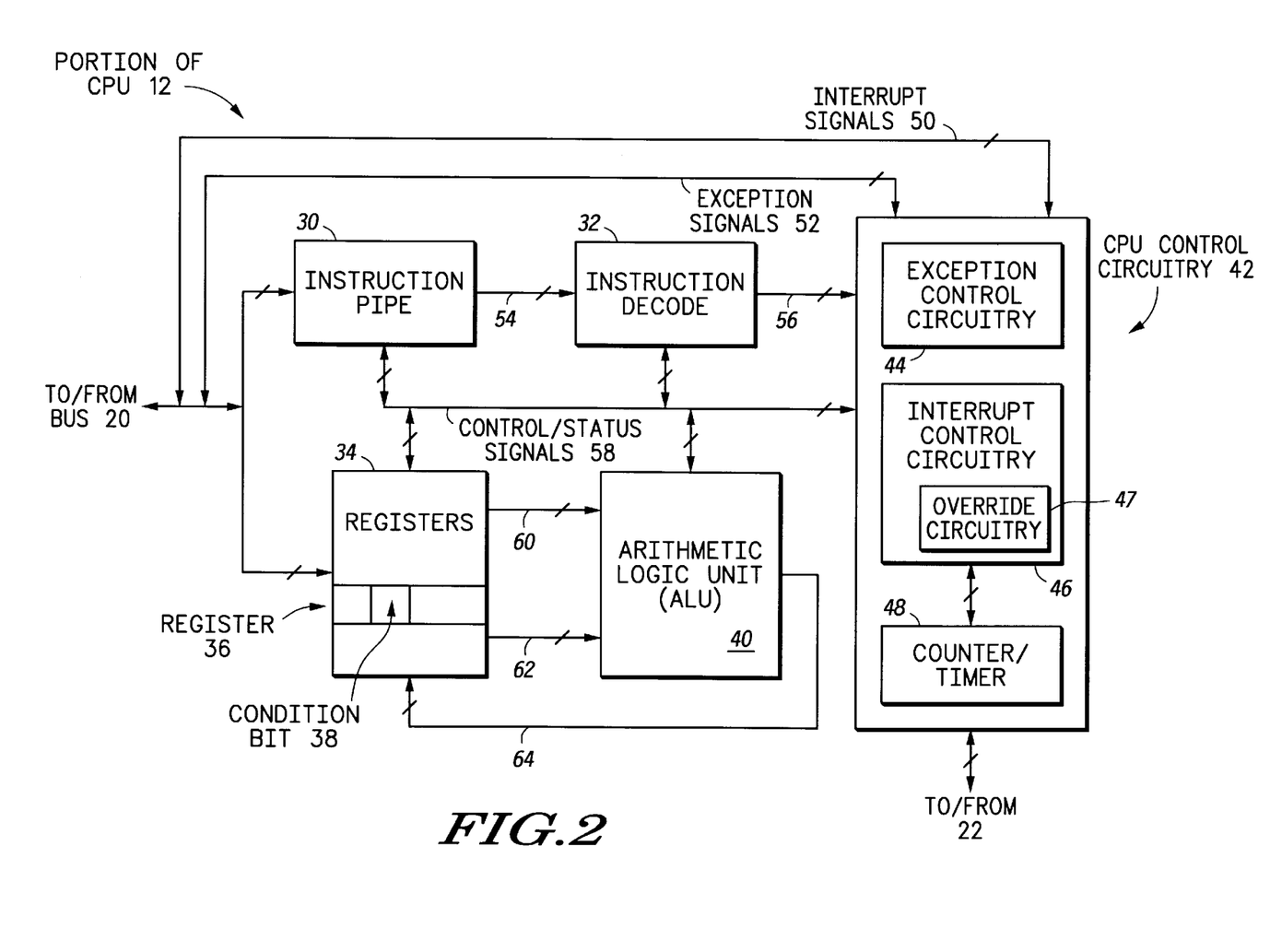
FIG. 2 illustrates, in block diagram form, a portion of central processing unit (CPU) 12 of FIG. 1 in accordance with one embodiment of the present invention.

FIG. 2 illustrates a portion of CPU 12 of FIG. 1. In one embodiment, CPU 12 includes instruction pipe circuitry 30, instruction decode circuitry 32, registers 34, arithmetic logic unit (ALU) 40, and CPU control circuitry 42. CPU control circuitry 42 is bi-directionally coupled to instruction pipe 30, instruction decode 32, registers 34, and ALU 40 by way of control/status signals 58 in order to provide control information and to receive status information. Instruction pipe 30 receives instructions by way of bus 20. Instruction pipe 30 may store one or more instructions that are to be executed. Instruction pipe 30 provides instructions to instruction decode circuitry 32 by way of conductors 54. Instruction decode circuitry 32 decodes the instructions it receives from the instruction pipe 30 and provides the output to CPU control circuitry 42 by way of conductors 56. CPU control circuitry 42 includes exception control circuitry 44, interrupt control circuitry 46, and counter/timer circuitry 48.

In one embodiment of the present invention, interrupt control circuitry 46 is bi-directionally coupled to counter/timer circuitry 48. CPU control circuitry 42 receives one or more interrupt request signals from bus 20 by way of interrupt signals 50. Other modules 18 (see FIG. 1) or circuitry coupled to external bus 26 (not shown) may be the source of one or more interrupt requests received by CPU control circuitry 42 by way of interrupt signals 50. CPU control circuitry 42 may provide one or more interrupt acknowledge or other interrupt related signals to bus 20 by way of interrupt signals 50. CPU control circuitry 42 may optionally receive one or more exception occurred signals by way of exception signals 52. In some embodiments of the present invention, CPU control circuitry 42 may provide to bus 20 one or more exception acknowledge or other exception status signals.

Still referring to FIG. 2, in one embodiment of the present invention, exception control circuitry 44 is coupled to exception signals 52 and interrupt control circuitry 46 is coupled to interrupt signals 50. Exception control circuitry 44 and interrupt control circuitry 46 are both coupled to conductors 56 and control/status signals 58. Interrupt control circuitry 46 may optionally include override circuitry 47. In alternate embodiments of the present invention, override circuitry 47 may be located elsewhere in CPU control circuitry 42. CPU control circuitry 42 may optionally be coupled external to data processor 10 by way of integrated circuit terminals 22. Registers 34 are bi-directionally coupled to bus 20 in order to receive and provide data values. Registers 34 include register 36. Register 36 includes a condition bit 38. Registers 34 are coupled to ALU 40 by way of conductors 60 and conductors 62 in order to provide values. The output of ALU 40 is coupled to registers 34 by way of conductors 64 in order to provide output values from ALU 40.

Figure 3:
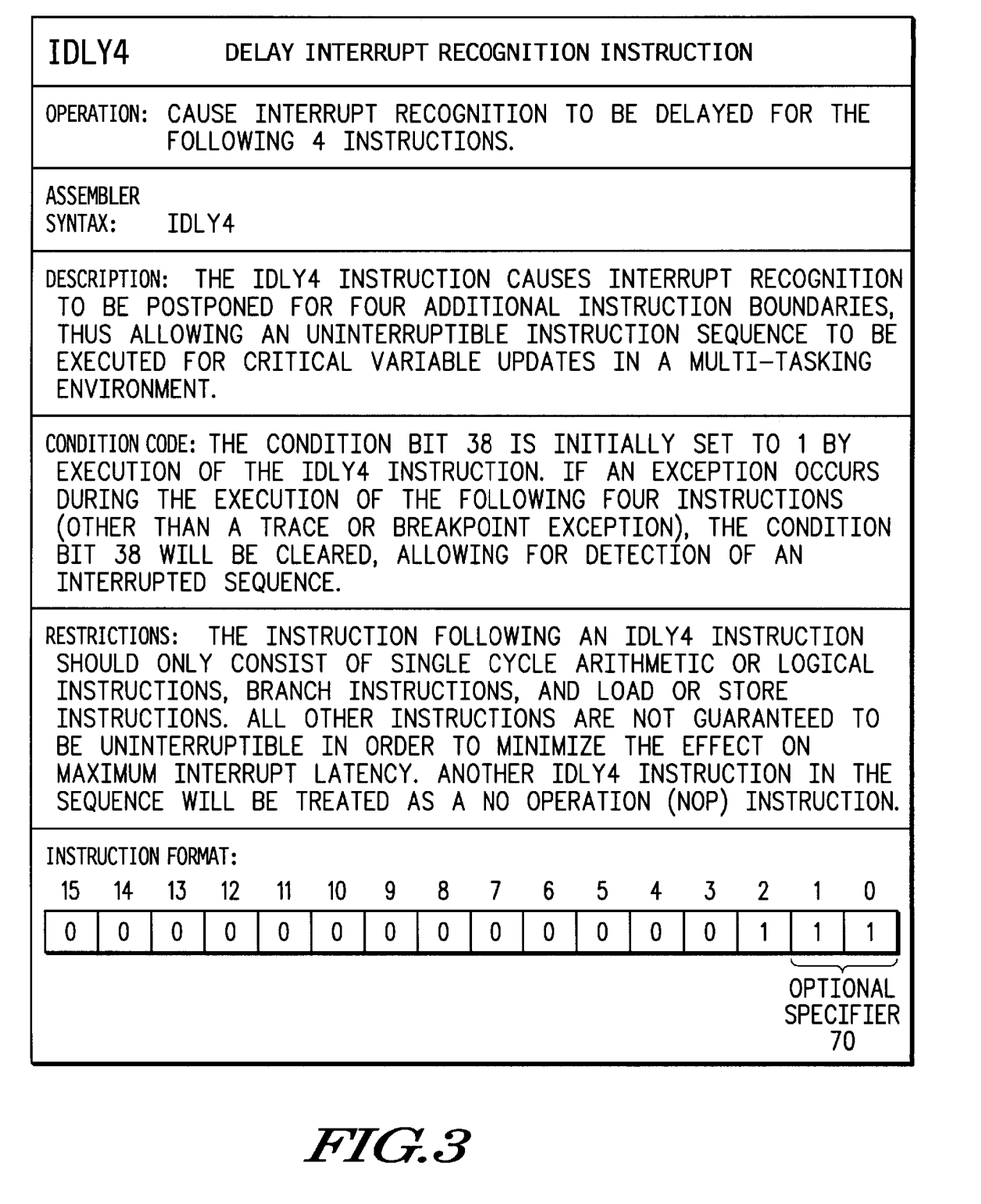
FIG. 3 illustrates, in tabular form, one embodiment of a delay interrupt recognition instruction in accordance with one embodiment of the present invention.

FIG. 3 illustrates one embodiment of a delay interrupt recognition instruction that may be executed by CPU 12 of FIG. 2.

Figure 4:
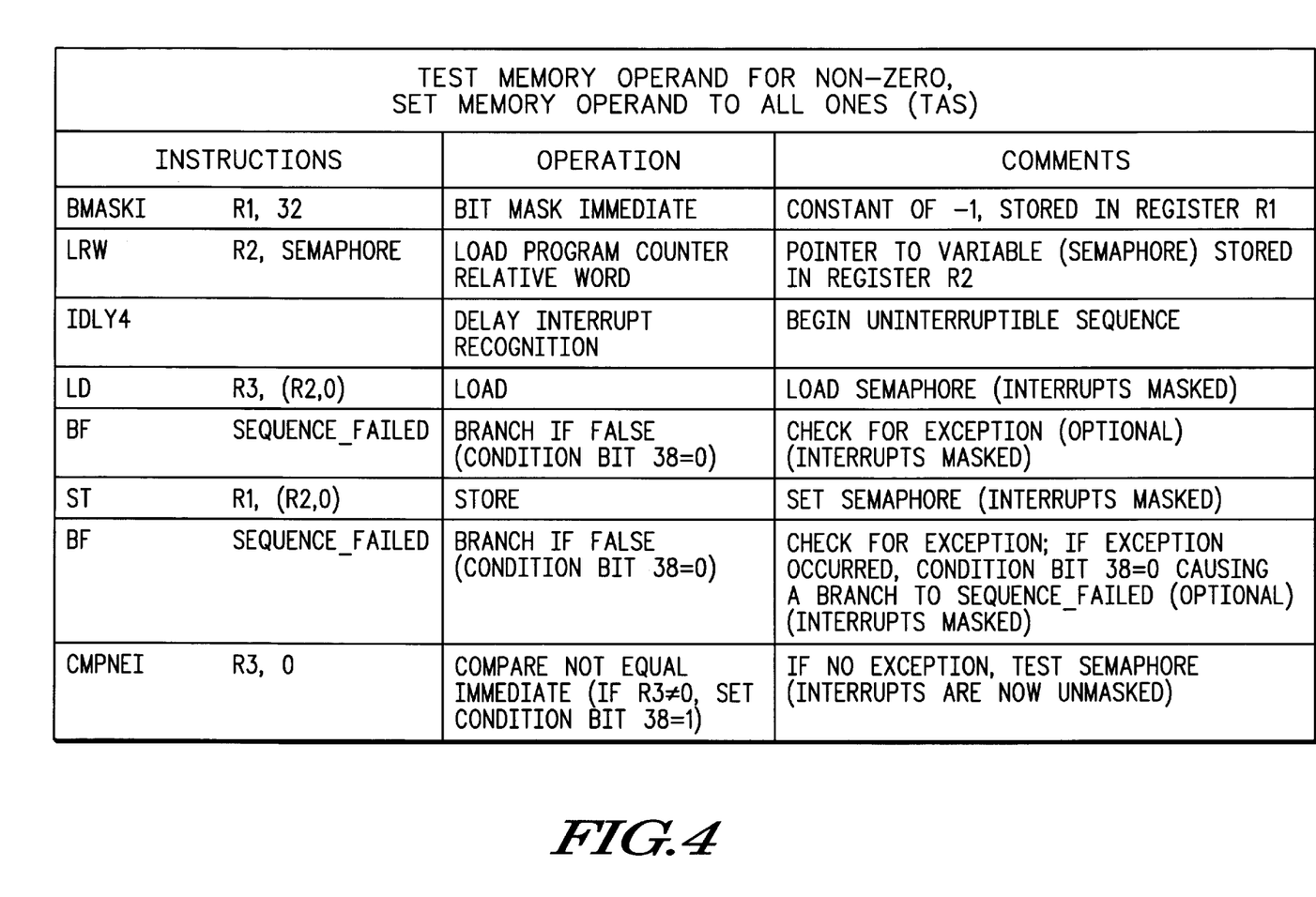
FIG. 4 illustrates, in tabular form, one embodiment of a sequence of instructions to perform a test and set function in accordance with one embodiment of the present invention.

FIG. 4 illustrates one embodiment of a sequence of instructions that may be used to perform a test and set function using the delay interrupt recognition instruction of FIG. 3.

Figure 5:
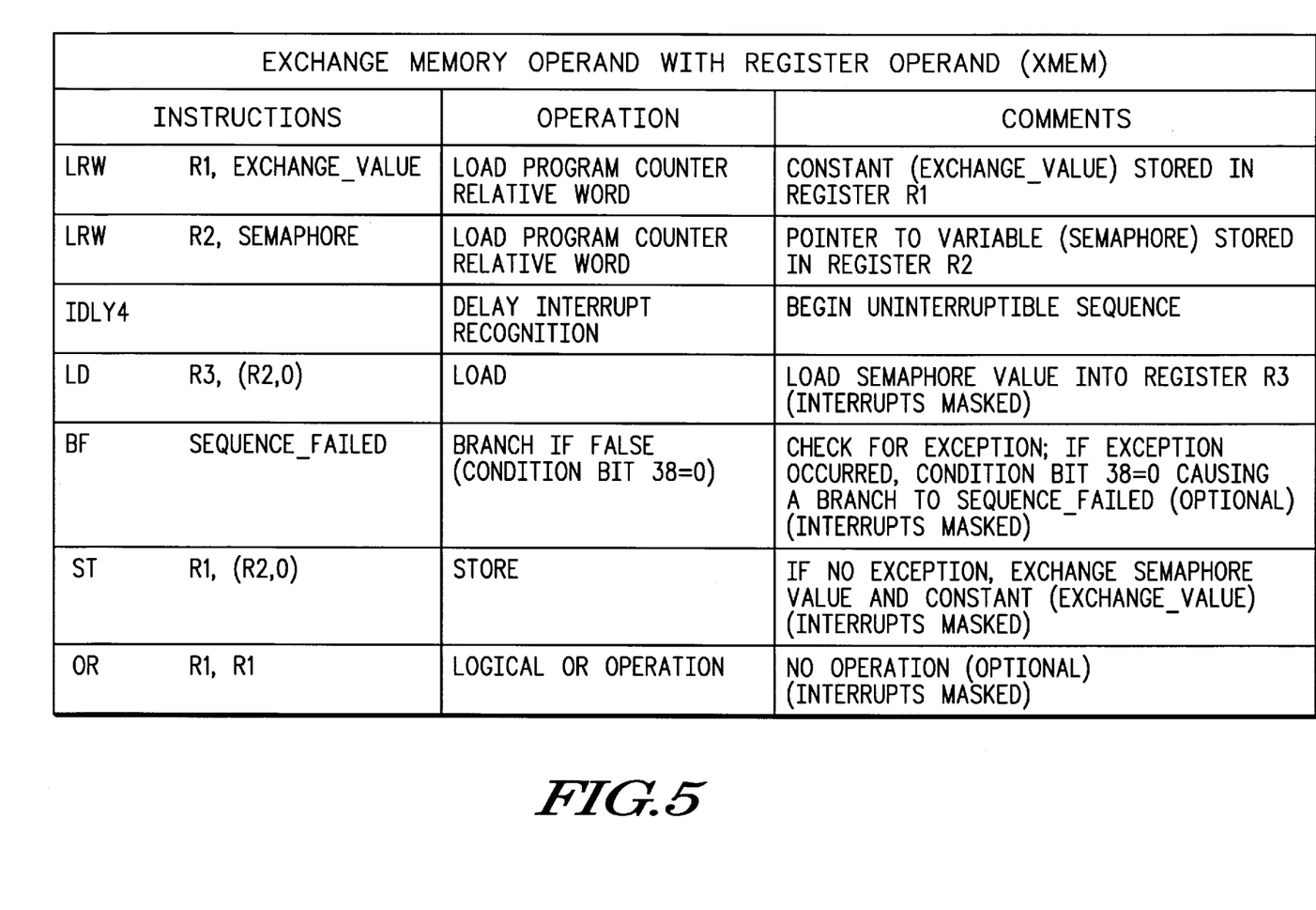
FIG. 5 illustrates, in tabular form, one embodiment of a sequence of instructions to perform an exchange memory operand function in accordance with one embodiment of the present invention.

FIG. 5 illustrates one embodiment of a sequence of instructions that may be used to perform an exchange memory operand function using the delay interrupt recognition instruction of FIG. 3.

Figure 6:
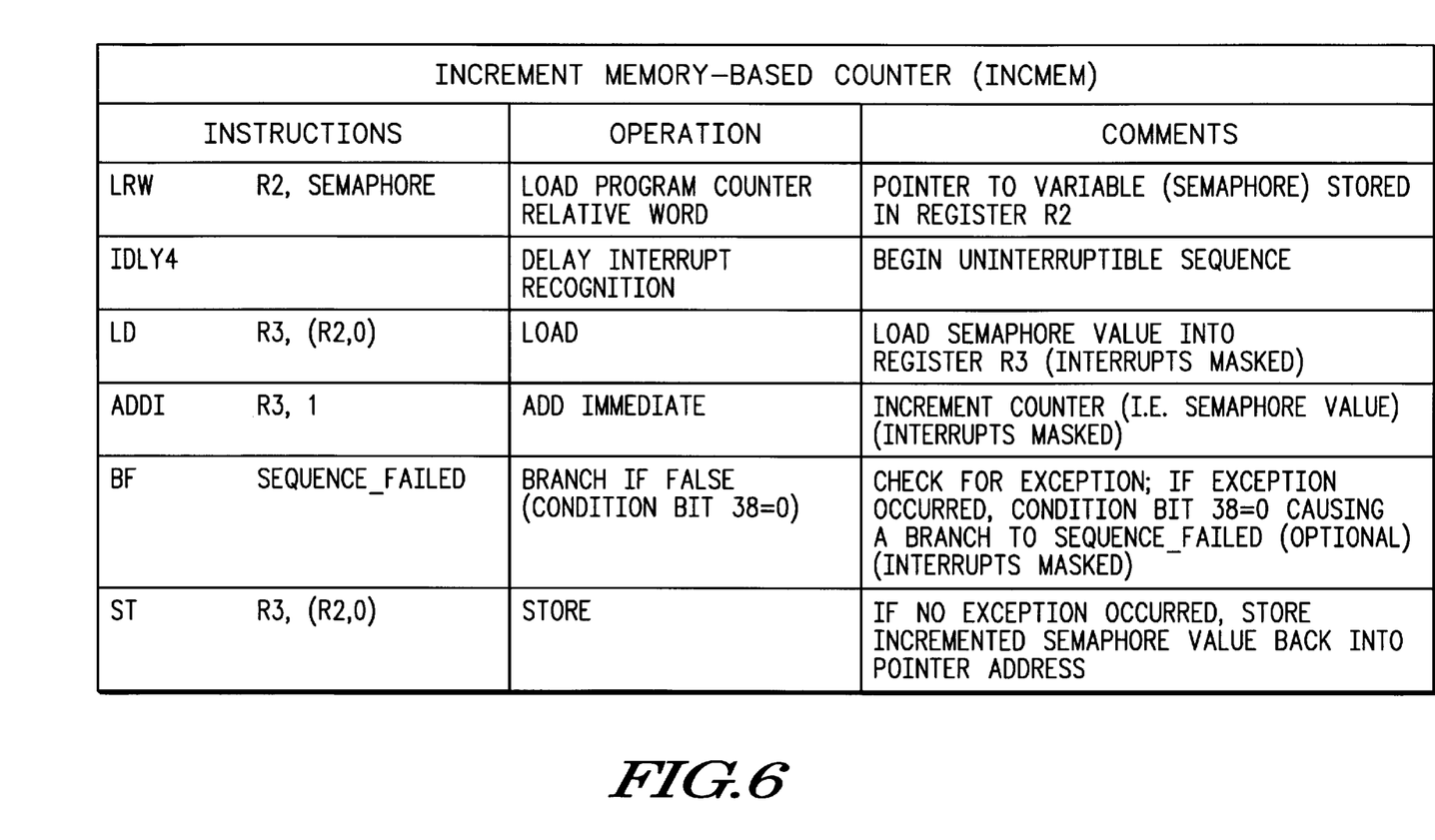
FIG. 6 illustrates, in tabular form, one embodiment of a sequence of instructions to perform an increment memory-based counter function in accordance with one embodiment of the present invention.

FIG. 6 illustrates one embodiment of a sequence of instructions that may be used to perform an increment memorybased counter function using the delay interrupt recognition instruction of FIG. 3.

Operation of the Preferred Embodiments

The operation of the preferred embodiments will now be described. In one embodiment, the present invention provides an efficient method and apparatus to delay interrupt recognition for a controlled interval, either for a predetermined period of time or for a predetermined number of instructions, so that a read/modify/write sequence of instructions can be performed without dedicated instructions which define the modification operation.

The term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

Referring to FIG. 3, in one embodiment of the present invention, a delay interrupt recognition instruction (e.g. IDLY4) may be used to cause interrupt recognition to be delayed for a predetermined number of instructions in a processor using a load/store architecture such as data processor 10 illustrated in FIGS. 1 and 2.

In one embodiment of the present invention, the predetermined number of immediately subsequent instructions during which interrupt recognition is delayed may be a fixed value (e.g. four instructions). Alternate embodiments of the present invention may fix this predetermined number of instructions to be any positive integer number. One embodiment of the present invention illustrated in FIG. 3 delays recognition of interrupts for the four instructions which are executed immediately after execution of the delay interrupt recognition instruction (IDLY4). Thus, the delay interrupt recognition instruction is executed, then during the following four instructions no interrupts are recognized and interrupt recognition begins with the initial execution of the fifth instruction following the IDLY4 instruction.

Note that some embodiments of the present invention may count the instructions executed as part of exception processing as part of the predetermined number of subsequent instructions, while other embodiments of the present invention may not count the instructions executed as part of exception processing as part of the predetermined number of subsequent instructions.

In a first embodiment of the present invention, interrupt recognition is inhibited or delayed during execution of a predetermined number of instructions after the delay interrupt recognition instruction has been executed. This predetermined number of instructions during which interrupt execution is inhibited or delayed may be defined in a variety of ways. For example, the delay interrupt recognition instruction itself may include a field which defines the number of instructions during which the recognition of interrupts is delayed (e.g. see optional specifier field 70 in FIG. 3). In alternate embodiments, a control register (e.g. one of registers 34 in FIG. 2) which is programmable by the user may contain a value which determines the predetermined number of instructions during which the recognition of interrupts is delayed. Alternate embodiments of the present invention may use any type of method for selecting the predetermined number of instructions, such as, for example, providing the predetermined number of instructions by way of integrated circuit terminals or by way of a mask programmable storage device.

In one embodiment of the present invention, if the delay interrupt recognition instruction delays recognition of interrupts during execution of a predetermined number of subsequent instructions, the circuitry illustrated in FIG. 2 functions in the following manner. The delay interrupt recognition instruction is received from bus 20 by way of instruction pipe 30. Instruction pipe 30 then provides this instruction to instruction decode circuitry 32 at the proper time. Instruction decode circuitry 32 then provides the appropriate decoded signals for the delay interrupt recognition instruction to CPU control circuitry 42 by way of conductors 56. CPU control circuitry 42 will then use interrupt control circuitry 46 to delay recognition of interrupt requests which are received by way of interrupt signals 50. CPU control circuitry 42 will delay recognition of interrupt requests for a predetermined number of instructions. CPU control circuitry 42 may use counter/timer 48 and information received from instruction pipe 30 and instruction decode circuitry 32 by way of signals 58 to determine how many instructions have been executed immediately subsequent to execution of the delay interrupt recognition instruction.

For some embodiments of the present invention, particularly those using a pipelined processor architecture, CPU control circuitry 42 may count only subsequent instructions which have completed execution, or may count any subsequent instructions for which a predetermined stage has been reached during the fetch, decode, execute cycle of each instruction.

Instead of delaying the recognition of interrupts for a predetermined number of subsequent instructions, alternate embodiments of the present invention may define a predetermined period of time in which interrupt recognition is delayed. In these alternate embodiments, a counter or timer (e.g. counter/timer 48 in FIG. 2) may be used to count a predetermined number of clock cycles or to count a predetermined number of nanoseconds during which interrupt recognition is delayed.

In one embodiment of the present invention, if the delay interrupt recognition instruction delays recognition of interrupts during execution of a predetermined number of subsequent clock cycles or nanoseconds, the CPU control circuitry 42 illustrated in FIG. 2 will use counter/timer 48 to count nanoseconds or clock cycles rather than the number of instructions being executed. Again, a user programmable mechanism, such as the instruction itself (e.g. optional specifier field 70 in FIG. 3), a register value or another programmable method may be used to provide the number of nanoseconds or the number of clock cycles to counter/timer 48 in order to determine the length of the interval during which interrupts will not be recognized following execution of the delay interrupt recognition instruction.

In one embodiment of the present invention, CPU control circuitry 42 begins counting the interrupt non-recognition interval after execution of the delay interrupt recognition instruction has been completed. However, in alternate embodiments of the present invention, CPU control circuitry 42 may begin counting the interrupt non-recognition interval at any point in time after the decoding of the delay interrupt recognition instruction has begun.

For some embodiments of the present invention, any type of instructions may follow a delay interrupt recognition instruction. However, in some situations, placing instructions that require a significant number of cycles, such as a divide instruction, in the instruction sequence following a delay interrupt recognition instruction may result in an interrupt latency that is too long a period of time. In order to address this problem, some embodiments of the present invention restrict the type of instructions that may immediately follow a delay interrupt recognition instruction. For example, referring to FIG. 3, the four instructions immediately following the delay interrupt recognition instruction may be limited to single cycle arithmetic or logical instructions, branch instructions, and load or store instructions. The purpose of restricting the instructions during which interrupt recognition is delayed is to reduce the maximum interrupt latency period of time. Alternate embodiments of the present invention may or may not limit the types of instructions during which interrupt recognition is delayed, and thus may or may not limit the types of instruction that may follow a delay interrupt recognition instruction. The specific set of instructions which may follow a delay interrupt recognition instruction may vary for different processors 10, and in some embodiments may be user programmable.

Alternate embodiments of the present invention may be affected by exception processing in different ways. In the embodiment of the present invention illustrated in FIG. 3, exceptions are still detected and taken during the interval in which interrupts are not being recognized. However, alternate embodiments of the present invention may detect and yet not process exceptions which occur during the interval in which interrupt recognition is delayed. Yet other alternate embodiments may not even detect exceptions, and thus not process them as well, during the interval in which interrupts are not being recognized. In addition, alternate embodiments of the present invention may handle different types of exceptions differently as well. For example, the delay interrupt recognition instruction (IDLY4) illustrated in FIG. 3 allows the occurrence of non-trace and non-breakpoint exceptions to clear condition bit 38 (see FIG. 2) during the interval in which interrupts are not being recognized, while trace and breakpoint exceptions do not affect condition bit 38.

In some embodiments of the present invention, a mechanism may be used to re-allow interrupts during the interrupt non-recognition interval subsequent to the execution of a delay interrupt recognition instruction. For example, counter/timer 48 may be used to detect that an interrupt of a particular level has been pending for a predetermined period of time during the interval, and thus needs to be recognized before the interrupt non-recognition interval is over. Thus in some embodiments of the present invention, interrupts may be re-allowed using override circuitry 47 even while execution still remains within the interrupt non-recognition interval (i.e. as defined by a predetermined number of instructions, clock cycles, or nanoseconds). If interrupt recognition is re-allowed, the current instruction may be interrupted mid-stream or may be allowed to continue and complete execution before interrupts are again recognized.

Some embodiments of the present invention may delay the recognition of all interrupts, while alternate embodiments of the present invention may only delay the recognition of interrupts which are below a predetermined interrupt level. The predetermined interrupt level may be specified in any manner. For example, the predetermined interrupt level may be specified as part of the delay interrupt recognition instruction format itself, may be specified by storing a value in a user programmable register, may be specified by providing a value by way of integrated circuit terminals, or may be specified by storing a value in a mask programmable storage circuit.

In an alternate embodiment, the present invention allows a first instruction to change the manner in which a subsequent instruction affects a status flag. In one embodiment of the present invention, the execution of the delay interrupt recognition instruction (IDLY4) illustrated in FIG. 3 may change the manner in which one or more subsequent instructions affect the condition bit 38 in FIG. 2. For example, referring to FIGS. 4–6, in one embodiment of the present invention, the IDLY4 instruction asserts the condition bit 38. Then if an exception occurs during any of the four subsequent instructions, the instruction that was executing when the exception occurred will negate the condition bit 38. Thus an instruction that is normally defined to never clear or negate the condition bit 38 (e.g. a load instruction) may now clear the condition code bit 38 if an exception occurs during execution of the load instruction when the load instruction is one of the four subsequent instructions after the IDLY4 instruction. The IDLY4 instruction may thus affect the manner in which a subsequent instruction (e.g. a load instruction) affects the condition bit 38. One purpose for using the condition bit 38 in this manner is to indicate that the four subsequent instructions were not executed in an indivisible manner and that exception processing may have affected a shared resource.

Note that the sequences of instructions illustrated in FIGS. 4–6 all include a check of the condition bit 38 to determine if an exception has been received and processed during the four non-exception processing instructions after the IDLY4 instruction (i.e. branch to SEQUENCE_FAILED if the condition code bit 38 equals zero). If an exception has been received and processed after the IDLY4 instruction, the "BF" instruction will branch to a subroutine of instructions called SEQUENCE_FAILED, which may be used to indicate that the four instructions after the IDLY4 instruction were not executed in an indivisible manner and that the exception processing may have affected a shared resource, such as a semaphore.

FIG. 4 illustrates a series of instructions which use the delay interrupt recognition instruction (IDLY4) illustrated in FIG. 3 to perform a test and set function. The test and set function illustrated in FIG. 4 tests a memory operand to determine if the memory operand's present value is all zeros, and changes the memory operand's value to all ones (i.e. all bits of the memory operand are set). Thus the series of instructions illustrated in FIG. 4 may be used to perform a test and set function on a semaphore value stored in memory. The delay interrupt recognition instruction (IDLY4) may be used to ensure that the test and set function is performed in an indivisible manner so that the semaphore value is not corrupted by a different task which interrupts the software routine illustrated in FIG. 4 between the test operation and the set operation.

Note that the instruction sequence illustrated in FIG. 4 actually performs the set operation before performing the test operation. This is possible because the IDLY4 instruction may be used to ensure that both the set and test operation will be completed before another task is allowed to interrupt, and because the semaphore value in this case has only two possible values, namely all ones or all zeroes. So if the semaphore's initial value was all ones, the step of setting the semaphore will not change the semaphore's value. Note that alternate instruction sequences which perform a test and set function may instead perform the test operation before the set operation.

FIG. 5 illustrates a series of instructions which use the delay interrupt recognition instruction (IDLY4) illustrated in FIG. 3 to perform an "exchange memory operand with register operand" function. The "exchange memory operand with register operand" function illustrated in FIG. 5 effectively moves a value called "EXCHANGE_VALUE" from its initial location in memory, into register R1, and then to the location of the semaphore value. Note that the location of the semaphore value is pointed to by a pointer called "SEMAPHORE". The semaphore value is moved from its initial location in memory to the register R3. In the particular sequence of instructions illustrated in FIG. 5, the final "OR" instruction performs no useful operation other than completing the sequence of four instructions after the IDLY4 instruction, and thus discontinuing the delay of interrupt recognition. Therefore, the final "OR" instruction has the same effect as a no operation (NOP) instruction and may be replaced with a different instruction.

FIG. 6 illustrates a series of instructions which use the delay interrupt recognition instruction (IDLY4) illustrated in FIG. 3 to perform an "increment memory-based counter" function. The "increment memory-based counter" function illustrated in FIG. 6 effectively moves the semaphore value from its initial location in memory into register R3, and then increments the semaphore value by adding one. Note that the location of the semaphore value is pointed to by a pointer called "SEMAPHORE". The incremented semaphore value is then moved back into its initial location in memory from the register R3.

While the present invention has been illustrated and described with reference to specific embodiments, further modifications and improvements will occur to those skilled in the art. It is to be understood, therefore, that this invention is not limited to the particular forms illustrated and that the appended claims cover all modifications that do not depart from the spirit and scope of this invention.

What is claimed is:

1. A method for affecting subsequent instruction processing in a data processor, comprising:

providing a first instruction;

providing a second instruction having a first behavior if execution of the second instruction occurs after execution of the first instruction, and having a second behavior different from the first behavior if execution of the first instruction has not occurred before execution of the second instruction begins;

wherein the only required information that must be saved from execution of the first instruction is the fact that the first instruction occurred, and wherein the first instruction and the second instruction are a same instruction.

2. A method as in claim 1, wherein interrupt recognition is selectively delayed for a controlled interval.

3. A method as in claim 2, wherein the same instruction has a mnemonic "IDLY4".

4. A method as in claim 1, wherein the first instruction and the second instruction have a same instruction opcode.

5. A method as in claim 1, further comprising the step of:

providing a no operation instruction;

wherein the first behavior of the second instruction is equivalent to a no operation instruction.

6. A method as in claim 1, wherein the first behavior of the second instruction includes causing an exception to be taken.

7. A method as in claim 1, wherein the second behavior of the second instruction includes delaying processing by the data processor of an exception.

8. A method as in claim 7, wherein the exception is an interrupt.

9. A data processor, comprising:
   instruction execution circuitry which executes a first instruction that has a first behavior if execution of a second instruction occurs after execution of the first instruction, and that has a second behavior different from the first behavior if execution of the first instruction has not occurred before execution of the second instruction begins; and
   a flag for indicating a predetermined condition within the data processor;
wherein the first behavior includes the flag being placed in a predetermined first state, and wherein the second behavior does not affect a state of the flag, and wherein the only required information that must be saved from execution of the first instruction is the fact that the first instruction occurred.

10. A data processor as in claim 9, wherein interrupt recognition is selectively delayed for a controlled interval.

11. A data processor as in claim 9, wherein if an exception occurs during a predetermined instruction interval after execution of the first instruction, the flag will be placed in a predetermined second state which is different than the predetermined first state.

12. A data processor as in claim 11, wherein the predetermined instruction interval is four instructions long.

13. A data processor as in claim 11, wherein the predetermined instruction interval is a programmable length of time.

14. A method as in claim 9, wherein the first instruction and the second instruction are a same instruction.

15. A method as in claim 9, wherein the first instruction has a mnemonic "IDLY4".

16. A method as in claim 9, wherein the first instruction and the second instruction have a same instruction opcode.

* * * * *